United States Patent [19]
Sugimoto et al.

[11] Patent Number: 5,442,974
[45] Date of Patent: Aug. 22, 1995

[54] SHIFT-OPERATION APPARATUS FOR AUTOMATIC TRANSMISSION

[75] Inventors: Satoshi Sugimoto; Toshiki Akita; Yoshinori Hattori, all of Aichi; Kazuyoshi Ishiguro, Aichi, all of Japan

[73] Assignee: Kabushiki Kaisha Tokai-Rika-Denki-Seisakusho, Aichi, Japan

[21] Appl. No.: 242,666

[22] Filed: May 13, 1994

[30] Foreign Application Priority Data

| May 17, 1993 | [JP] | Japan | 5-025534 U |
| May 17, 1993 | [JP] | Japan | 5-025535 U |
| May 26, 1993 | [JP] | Japan | 5-027697 U |

[51] Int. Cl.[6] .................................................. F16H 59/04
[52] U.S. Cl. ........................................ 74/335; 200/61.88
[58] Field of Search ........................ 74/335; 200/61.88

[56] References Cited

U.S. PATENT DOCUMENTS 5,156,243 10/1992 Aoki et al. ............................ 192/4 A
5,370,015 12/1994 Moscatelli ............................ 74/335

Primary Examiner—Dirk Wright
Attorney, Agent, or Firm—Sixbey, Friedman, Leedom, & Ferguson

[57] ABSTRACT

A fitting groove 46 comprised of a first groove 48 and a second groove 50 is formed in a holder connected to an operation knob. As a pin 54 of a shaft 52 is inserted in the fitting groove 46, the shaft 52 is connected to a holder 24, i.e., the operation knob. As a result, even in a shift-lock state in which the axial movement of the shaft 52 is prevented, it is possible to carry out without trouble the operation of selecting a shift position N, D, or 2 by the rotation of the holder 24 as well as the operation of selecting a shift position L involving the rotation and axial movement of the holder 24. In addition, it is possible to set a multiplicity of shift positions which are selected by the holder 24.

20 Claims, 13 Drawing Sheets

[5,442,974]

SHIFT-OPERATION APPARATUS FOR AUTOMATIC TRANSMISSION

BACKGROUND OF THE INVENTION

1. Field of the Invention

The present invention relates to a shift-operation apparatus for use in an automatic transmission of a vehicle.

2. Description of the Related Art

As apparatus for effecting a shifting operation for an automatic transmission of a vehicle, a shift lever apparatus is generally used which is disposed on a floor surface of the vehicle, is coupled to the automatic transmission, and effects a shifting operation for the automatic transmission mechanically by selecting and operating a lever. In recent years, a shift-operation apparatus has been devised which is disposed in the vicinity of a steering wheel, electrically detects a shift position selected by a shifting operation, and effects a shifting operation for the automatic transmission on the basis of this detected signal.

This type of shift-operation apparatus for an automatic transmission has an operation knob for a shifting operation and a switch for detecting a shift position selected by this operation knob. The shift positions of the operation knob correspond to a P shift range, an R shift range, an N shift range, a D shift range, and the like of the automatic transmission. Each of these shift positions is detected by the switch, and shifts the automatic transmission on the basis of a detected signal.

Among such shift-operation apparatuses for automatic transmissions, there is an apparatus which is arranged to select each shift position by rotating the operation knob with respect to an axis and moving it in the axial direction. For instance, the following shift-operation apparatus is known: Shift positions such as the N shift range, the D shift range, the 2 shift range, and the like are set in correspondence with the rotating direction of the operation knob, and shift positions such as the P shift range, the R shift range, and the like are set in correspondence with the axial direction of the operation knob. As this operation knob is rotated, a shift position such as the N shift range, the D shift range, the 2 shift range, or the like is selected, and as the operation knob is moved in the axial direction, a shift position such as the P shift range, the R shift range, or the like is selected.

With this type of shift-operation apparatus, a displacement of the operation knob in the rotating direction is detected by a switching means such as a contact plate, for instance. Meanwhile, a displacement of the operation knob in the axial direction is detected by another switch or the like as the axial movement of a shaft connected to this operation knob.

However, if such a shift position is further set as is selected by performing both the rotation and axial movement of the operation knob in addition to selecting a shift position in correspondence with the mere rotation and axial movement of the operation knob, there arises a drawback in that the switch for detecting only the axial movement of the operation knob (i.e., the axial movement of the shaft) is unnecessarily actuated when the operation knob is operated to the shift position which is selected by performing both the rotation and axial movement of the operation knob. Accordingly, a countermeasure against this drawback has been required.

Furthermore, in a case where there is provided a mechanism for prohibiting a shifting operation effected by the axial movement of the shaft, i.e., the axial movement of the operation knob (the operation of selecting a shift position such as the P shift range, the R shift range, or the like, as described above) under a predetermined condition (setting the operation knob in a so-called shift-lock state), since the axial movement of the operation knob is prevented, there arises a drawback in that the operation knob cannot be operated to the shift position which is selected by performing both the rotation and axial movement of the operation knob. Hence, a countermeasure against this drawback has also been required.

SUMMARY OF THE INVENTION

Accordingly, in view of the above-described problems, a primary object of the present invention is to provide a shift-operation apparatus for an automatic transmission which, through a simple structure, makes it possible to perform a shifting operation effected by the rotation of the operation knob and a shifting operation involving both the rotation and axial movement of the operation knob without trouble even in the shift-lock state in which the axial movement of the operation knob is prevented, thereby making it possible to set a multiplicity of shift positions selected by the operation knob and expanding the operational range of the operation knob.

A second object of the present invention is to provide a shift-operation apparatus for an automatic transmission which, through a simple structure, makes it possible to select each shift position by rotating and axially moving the operation knob smoothly and reliably such that each shift position selected is not changed unnecessarily by other than the operation of the operation knob, and which has durability allowing the initial performance to be maintained even if the selecting operation of the shift position is carried out frequently.

A third object of the present invention is to provide a shift-operation apparatus for an automatic transmission in which in a case where shift positions which are selected by the rotation of the operation knob, shift positions which are selected by the axial movement of the operation knob, and a shift position which is selected by performing both the rotation and axial movement of the operation knob are set, the operation knob can be operated smoothly among the respective shift positions, and the operation knob can be stopped and held reliably at a desired shift position, and which makes it possible to realize these arrangements with a simple structure.

In accordance with a first aspect of the present invention, there is provided a shift-operation apparatus for an automatic transmission, comprising:

an operation knob capable of rotation and axial movement and having a first shift position selected by a rotating operation, a second shift position selected by the axial movement, and a third shift position selected by the rotation and the axial movmement;

switch means for detecting a selected shift position of the operation knob so as to shift the automatic transmission;

a shaft disposed movably along an axis of the operation knob;

locking means disposed engageably and detachably with respect to the shaft, the locking means being adapted to prevent the axial movement of the shaft in an engaged state;

a solenoid connected to the locking means, the solenoid being actuated under a predetermined condition to cancel the engagement between the lock plate and the shaft; and a holder fixed integrally to the operation knob and adapted to move always with the operation knob, the holder being connected to the shaft so as to permit the movement of the operation knob to one of the first shift position and the third shift position in a state in which the lock plate is engaged with the shaft and the axial movement of the shaft is prevented.

In accordance with this aspect, as the operation knob is rotatively operated, a first shift position provided in correspondence with, for example, an N shift range or a D shift range is selected, which is detected by the switch means, so as to shift the automatic transmission. In addition, as the operation knob is moved in the axial direction, a second shift position provided in correspondence with, for example, an R shift range or a P shift range is selected, which is detected by the switch means, so as to shift the automatic transmission. Furthermore, as the operation knob is axially moved and rotated, a third shift position provided in correspondence with, for example, an L shift range is selected, which is detected by the switch means, so as to shift the automatic transmission.

Here, in a particular shift range, the solenoid is actuated in accordance with an individually set condition. For example, in a case where the operation knob is shifted to the N shift range, the solenoid is actuated at a predetermined vehicle speed or less set in correspondence with this N shift range. Accordingly, in this state, the lock plate is spaced apart from the shaft, so that the shaft is capable of moving in the axial direction. For this reason, the operation knob is capable of undergoing both the rotating operation and the axial movement, so that the operation knob can be shifted to each shift range. Meanwhile, the solenoid is stopped at a predetermined vehicle speed or more set in correspondence with the N shift range. Accordingly, in this state, the lock plate is engaged with the shaft, thereby preventing the axial movement of the shaft. Consequently, the operation knob is prevented from being operated to the second shift position (i.e., the movement to the R shift range or the P shift range) due to the axial movement thereof, so that the operation knob is set in a shift-lock state (so-called R inhibit).

In this shift-lock state (R inhibit), the axial movement of the shaft is prevented. However, since the shaft is connected to the holder in such a way that the operation knob is capable of moving to the first shift position (i.e., rotating) and moving to the third shift position (i.e., rotating and moving in the axial direction), the operation knob can be operated to the first shift position and the third shift position without moving the shaft in the axial direction.

Namely, even in this shift-lock state, not only can the first shift position be selected by rotatively operating the operation knob, but the third shift position can also be selected by axially moving and rotating the operation knob.

In addition, in this shift-lock state, since the axial movement of the shaft is prevented, when the operation knob is shifted to the third shift position (rotation and axial movement), a switch for detecting only the operation of the operation knob for selecting the first shift position (axial movement of the shaft) is prevented from being actuated unnecessarily.

As described above, as the shaft is connected to the operation knob by means of the holder, even in the shift-lock state in which the axial movement of the operation knob is prevented, it is possible to effect without trouble the shifting operation due to the rotation of the operation knob and the shifting operation involving the rotation and axial movement of the operation knob. In addition, it is possible to set a multiplicity of shift positions which are selected by the operation knob. Thus, the operational range of the operation knob expands.

In accordance with a second aspect of the present invention, there is provided a shift-operation apparatus for an automatic transmission, comprising:

an operation knob capable of rotation and axial movement for selecting a shift position by a rotating operation and/or an axially moving operation;

switch means for detecting a selected shift position of the operation knob so as to shift the automatic transmission;

an axially clicking mechanism including a first uneven-surface portion provided on one of the operation knob and the main body of the shift-operation apparatus and a small member disposed on another of the operation knob and the main body of the shift-operation apparatus and urged toward the first uneven-surface portion, so as to provide a click when the operation knob is moved in an axial direction;

a rotor for rotating integrally with the operation knob and connected to the operation knob in such a manner as to be capable of undergoing relative movement in the axial direction with respect to the operation knob; and a rotating-direction clicking mechanism including a second uneven-surface portion provided on one of the rotor and the main body of the shift-operation apparatus and a roller disposed on another of the rotor and the main body of the shift-operation apparatus, so as to provide a click when the operation knob is moved in a rotating direction.

In accordance with the above-described second aspect, as the operation knob is rotatively operated, a shift position provided in correspondence with, for example, the N shift range or the D shift range is selected, which is detected by the switch means, so as to shift the automatic transmission. In addition, as the operation knob is moved in the axial direction, a shift position provided in correspondence with, for example, the R shift range or the P shift range is selected, which is detected by the switch means, so as to shift the automatic transmission.

Here, when the operation knob is moved in the axial direction, the axial-direction clicking mechanism is operated. That is, as pieces disposed by being connected to the operation knob ride over uneven-surface members (first uneven-surface members), the axial movement of the operation knob is restricted with a click. In this case, since the rotor is connected to the operation knob in such a manner as to be capable of undergoing relative movement in the axial direction with respect to the operation knob, the rotor does not move even if the operation knob is moved in the axial direction. Accordingly, the rotating-direction clicking mechanism is not operated.

Meanwhile, when the operation knob is rotated, the rotor is rotated integrally with the operation knob, and the rotating-direction clicking mechanism is operated. That is, as rollers disposed by being connected to the rotor ride over uneven-surface members (second uneven-surface members), the rotation of the rotor, i.e., the operation knob, is restricted with a click.

Thus, in this shift-operation apparatus, as the pieces or the rollers ride over the uneven-surface members, the operation knob can be smoothly and reliably rotated and moved in the axial direction with a click to select each shift position. In addition, each shift position thus selected is prevented from being shifted unnecessarily by other than the operation of the operation knob. Furthermore, since the mechanisms for restricting the rotation and axial movement of the operation knob are arranged separately and independently of each other by the rotating-direction clicking mechanism corresponding to the rotating operation of the operation knob and the axial-direction clicking mechanism corresponding to the operation of axial movement thereof, the durability of the components improve remarkably. Even if the operation of selecting the shift positions of the operation knob is carried out frequently, it is possible to maintain the initial performance.

In accordance with a third aspect of the present invention, there is provided a shift-operation apparatus for an automatic transmission, comprising:

an operation knob capable of rotation and axial movement and having a first shift position selected by a rotating operation, a second shift position selected by the axial movement, and a third shift position selected by the rotation and the axial movmement;

a guide groove corresponding to the first, second, and third shift positions and formed in a shape of a pattern to connect the first, second, and third shift positions;

a pin inserted movably in the guide groove, wherein a portion of the guide groove leading from a connecting portion with respect to the first, second, and third shift positions to the third shift position is inclined with respect to a portion of the guide groove leading from the first shift position to the connecting portion and a portion of the guide groove leading from the second shift position to the connecting portion.

In accordance with this aspect, the operation knob is moved while the pin is being guided along the guide groove formed in the shape of a pattern in correspondence with the first to third shift positions, so as to select a shift position. Namely, as the operation knob is rotatively operated, the first shift position provided in correspondence with, for example, the N shift range or the D shift range is selected. In addition, as the operation knob is moved in the axial direction, the second shift position provided in correspondence with, for example, the P shift range is selected. Furthermore, as the operation knob is axially moved and rotated, third third shift position provided in correspondence with, for example, the R shift range is selected.

Here, a portion of the guide groove leading from a connecting portion to the third shift position is inclined with respect to a portion of the guide groove leading from the connecting portion to the first shift position and a portion of the guide groove leading from the connecting portion to the second shift position. Accordingly, when the operation knob is operated between the first and third shift positions or between the second and third shift positions, when a position where the axial direction of the operation knob and the rotation thereof are switched is reached, the pin in the guide groove is brought into contact with the inclined surface. The operation knob can be stopped and held reliably at this position. For instance, when the operation knob is moved in the axial direction from the second shift position to the first shift position, the operation knob is stopped positively at a boundary position between the first shift position and the third shift position, and is prevented from moving toward the third shift position by jumping that inclined surface.

In addition, in a case the operation knob is operated between the first shift position and the third shift position, not only can the operation knob be stopped reliably at a boundary position (connecting portion) between the first shift position and the third shift position, but as the pin moves along the inclined surface of the guide groove, the operation knob can be moved smoothly. Hence, the operational efficiency also improves.

As described above, with this shift-operation apparatus, when one of the first to third shift positions is selected, it is possible to smoothly operate the operation knob between the respective shift positions and to reliably stop and hold the operation knob at a desired shift position. At the same time, the arrangement therefor can be realized with a simple structure.

In accordance with a fourth aspect of the present invention, in the shift-operation apparatus for an automatic transmission according to the third aspect, a projecting portion is provided in the vicinity of the connecting portion in the portion of the guide groove leading from the connecting portion to the third shift position.

In this aspect, since the projecting portion is provided in the vicinity of the connecting portion in the portion of the guide groove leading from the connecting portion to the third shift position, when the operation knob is operated between the first and third shift positions or between the second and third shift positions, the pin in the guide groove is engaged with the projecting portion at the time the pin is brought into contact with the inclined surface. The operation knob can be stopped and held reliably at this position. For instance, when the operation knob is moved from the first shift position to the third shift position, the operation knob is stopped positively at at the projecting portion, and is prevented from moving toward the third shift position by jumping that projecting portion.

Thus, in accordance with this shift-operation apparatus, when one of the first to third shift positions is selected, the operation knob can be stopped and held more reliably at a desired shift position. In addition, an arrangement therefor can be realized with a simple structure.

The above and other objects, features and advantages of the present invention will become more apparent from the following detailed description of the invention when read in conjunction with the accompanying drawings.

DESCRIPTION OF THE PREFERRED EMBODIMENTS

Figure 1:
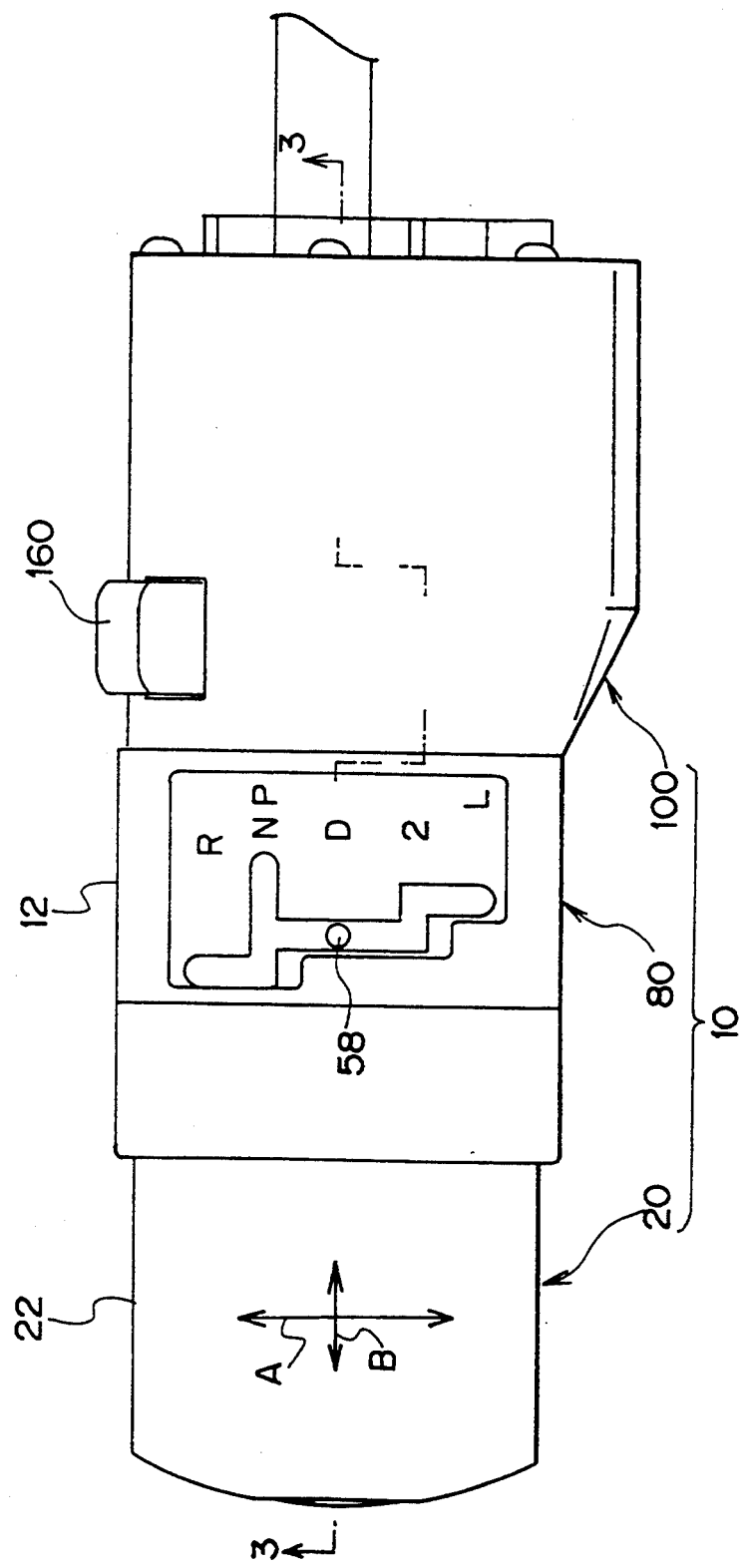
FIG. 1 is a front elevational view of a shift-operation apparatus for an automatic transmission in accordance with a first embodiment.
Figure 2:
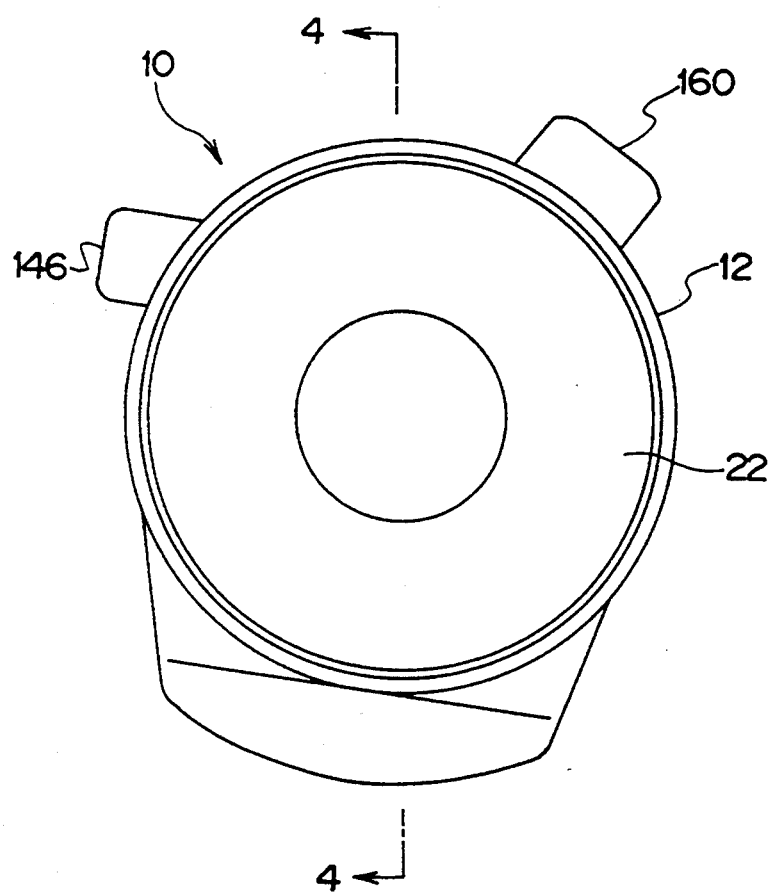
FIG. 2 is a left-hand side elevational view of the shift-operation apparatus for an automatic transmission in accordance with the first embodiment.
Figure 3:
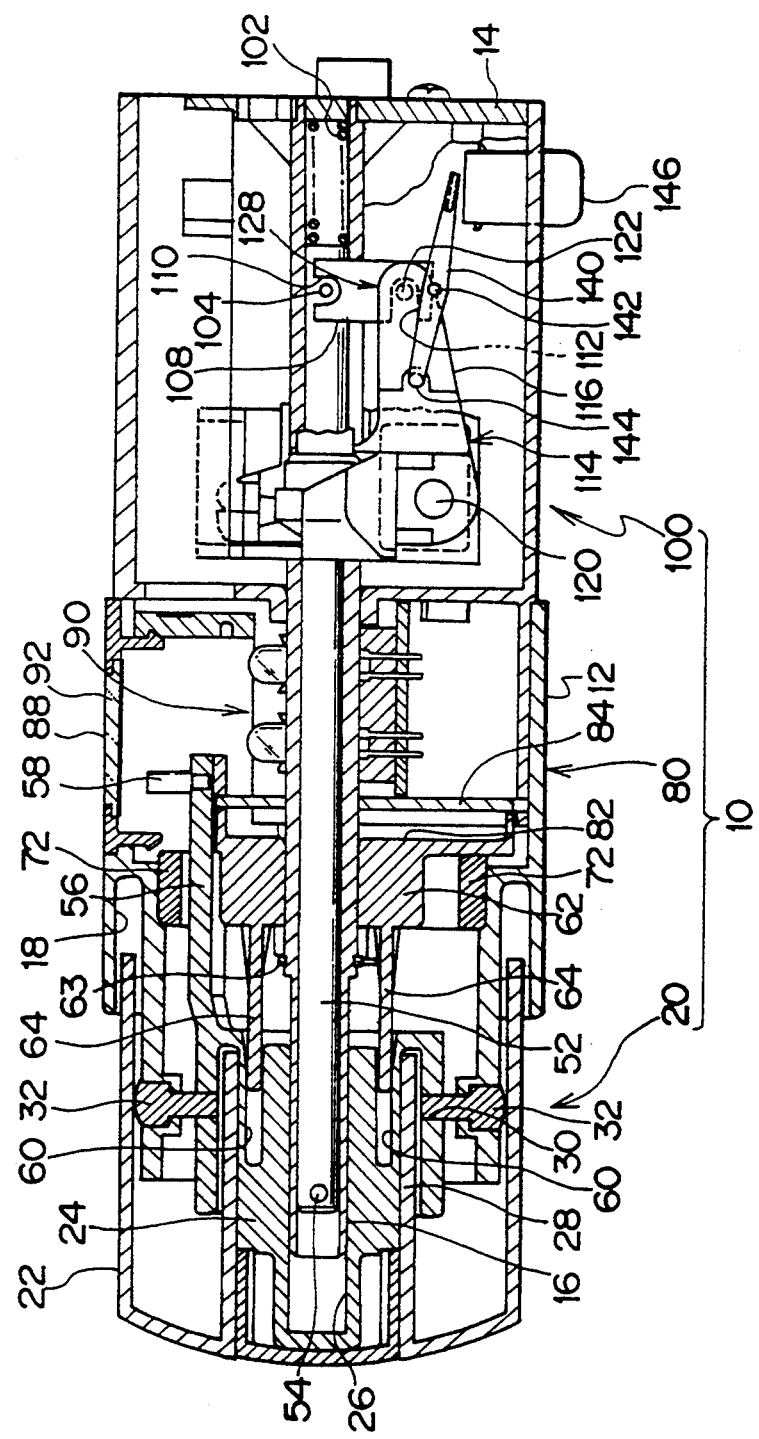
FIG. 3 is a cross-sectional view of the shift-operation apparatus taken along a line 3—3 of FIG. 1.
Figure 4:
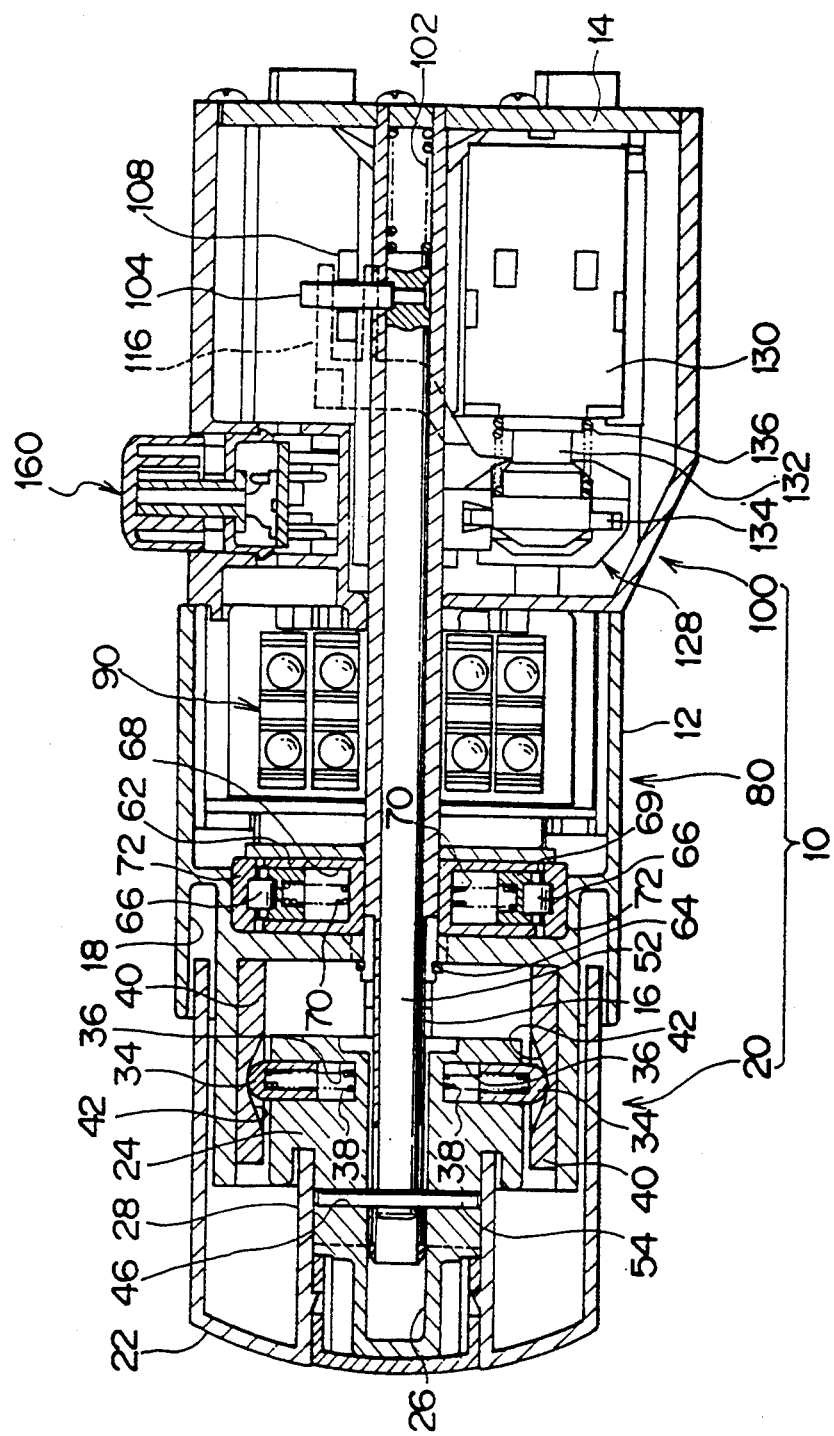
FIG. 4 is a cross-sectional view of the shift-operation apparatus taken along a line 4—4 of FIG. 2.
Figure 5:
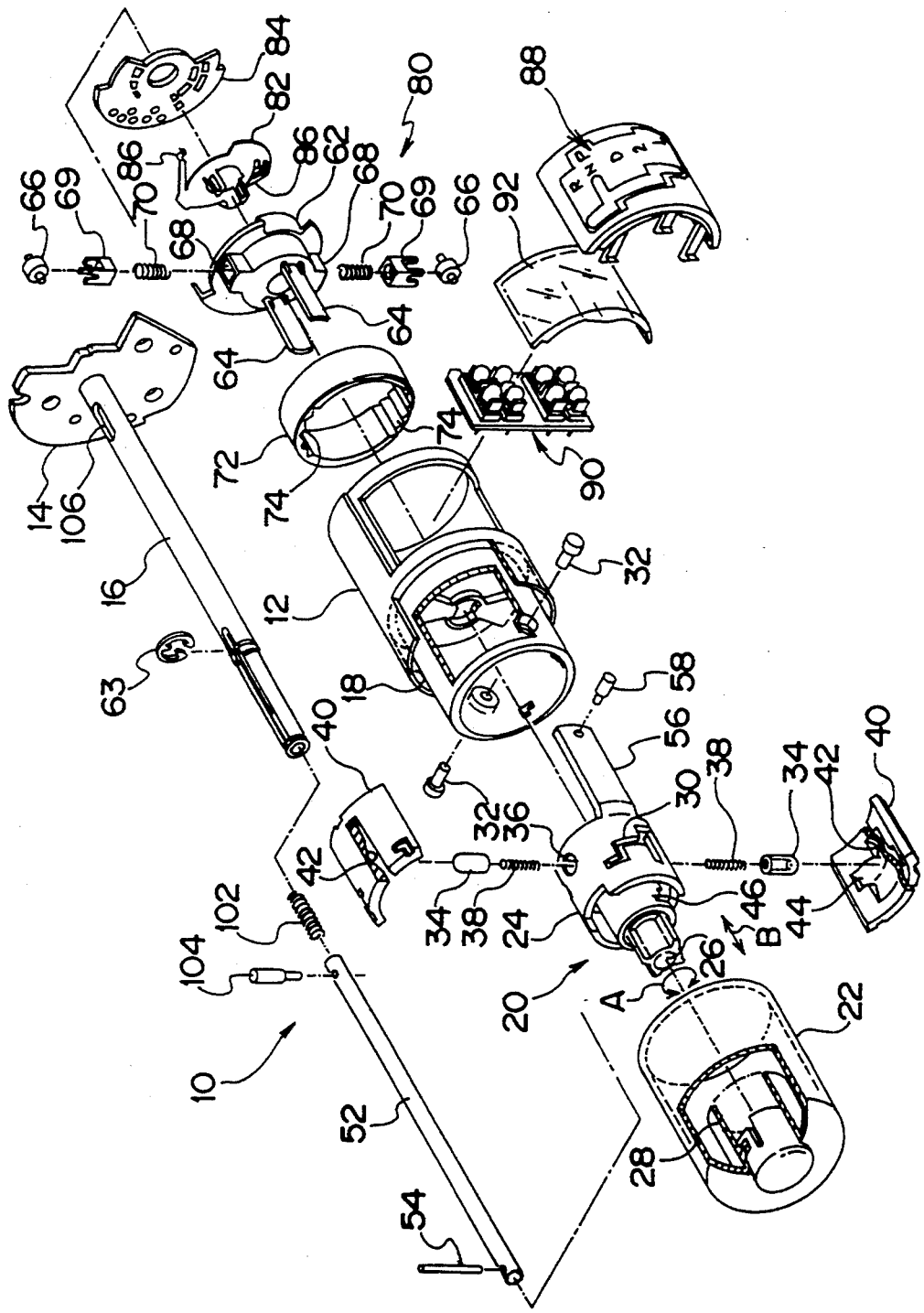
FIG. 5 is an exploded perspective view of the shift-operation apparatus for an automatic transmission in accordance with the first embodiment.
Figure 6:
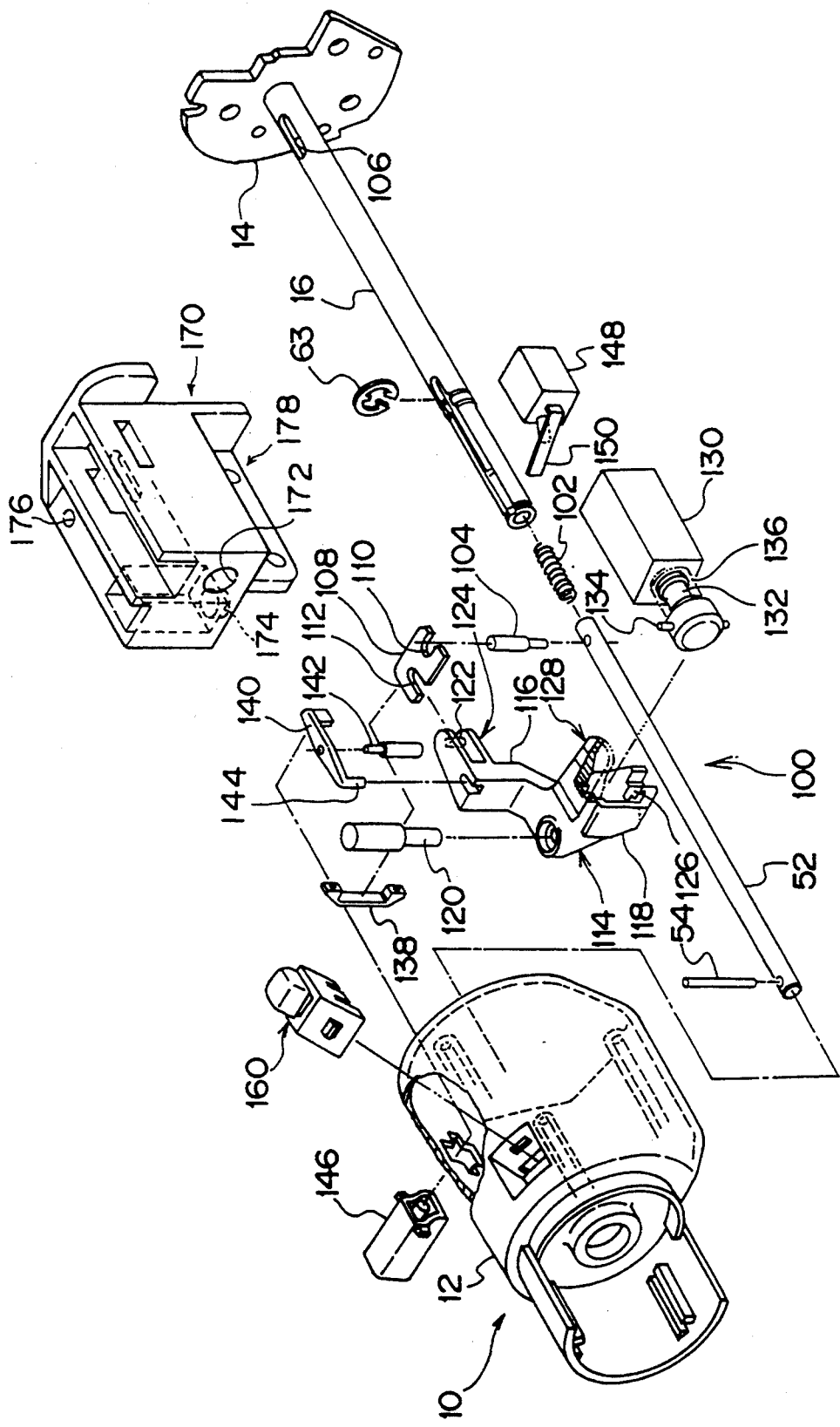
FIG. 6 is another exploded perspective view of the shift-operation apparatus for an automatic transmission in accordance with the first embodiment.

FIG. 1 shows a front elevational view of a shift-operation apparatus 10 for an automatic transmission in accordance with a first embodiment. FIG. 2 shows a left-hand side elevational view of the shift-operation apparatus 10. FIG. 3 shows a cross-sectional view of the shift-operation apparatus 10 taken along a line 3—3 of FIG. 1. FIG. 4 shows a cross-sectional view of the shift-operation apparatus 10 taken along a line 4—4 of FIG. 2. Furthermore, FIGS. 5 and 6 show exploded perspective views of this shift-operation apparatus 10. It should be noted that in FIGS. 5 and 6, some components are illustrated in a duplicated manner.

Here, this shift-operation apparatus 10 is used for an automatic transmission having an R shift range, a P shift range, an N shift range, a D shift range, a 2 shift range, and an L shift range.

The shift-operation apparatus 10 has a substantially cylindrical main body 12. This main body 12 is secured to a baseplate 14, and is disposed in the vicinity of a steering wheel (not shown) of a vehicle. A pipe 16 is secured to the baseplate 14 along the axis of the main body 12. This shift-operation apparatus 10 comprises an operation section 20, a switch section 80, and a shift lock section 100. Hereafter, the various sections will be described in order.

In the operation section 20, an operation knob 22 is disposed at a distal end portion of the main body 12. The operation knob 22 is formed in a substantially cylindrical shape corresponding to the main body 12, and is movably inserted in a guide groove 18 provided in the main body 12. That is, the operation knob 22 overlaps with the distal end portion of the main body 12, and is capable of rotating about the axis and moving along the axis with respect to the main body 12.

A holder 24 is placed inside the operation knob 22 (in the distal end portion of the main body 12). The holder 24 is made of a substantially columnar block material, and is positioned in correspondence with the distal end portion of the main body 12. The holder 24 has a through hole 26 formed in a central portion thereof, and the pipe 16 is inserted in this through hole 26. Furthermore, the holder 24 is integrally connected to an arm 28 projecting from the operation knob 22. As a result, the holder 24 rotates (about the pipe 16) and moves in the axial direction (along the pipe 16) always integrally with the operation knob 22.

A guide groove 30 having a pattern is formed in a peripheral surface of the holder 24. A pin 32, which is secured to the main body 12 in such a manner as to project inwardly from a distal end of the main body 12, is inserted in the guide groove 30. As a result, the holder 24, i.e., the operation knob 22, is capable of rotating and moving in the axial direction within the range in which the pin 32 is capable of moving in the guide groove 30.

Here, the shift-operation pattern of the operation knob 22 is arranged as shown in FIG. 1 in correspondence with the respective shift ranges of "P," "R," "N," "D," "2," and "L" of the automatic transmission. The guide groove 30 provided in the holder 24 is formed in correspondence with this shift-operation pattern of the operation knob 22. Namely, the shift operation in the direction of arrow A in FIG. 1 is effected by the rotation of the operation knob 22 (holder 24), while the shift operation in the direction of arrow B in FIG. 1 is effected by the axial movement of the operation knob 22 (holder 24). The guide groove 30 serves to guide and restrict the rotation and axial movement of the holder 24, i.e., the operation knob 22.

Figure 8:
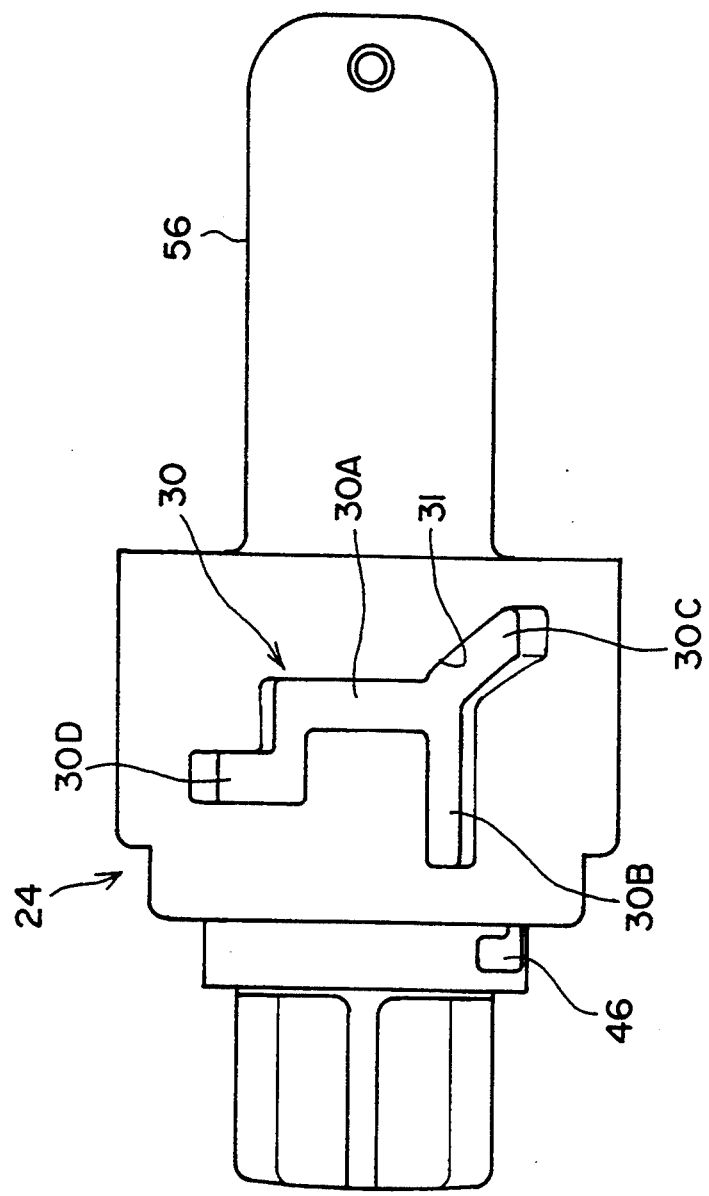
FIG. 8 is a plan view of the holder of the shift-operation apparatus for an automatic transmission in accordance with the first embodiment.
Figure 9:
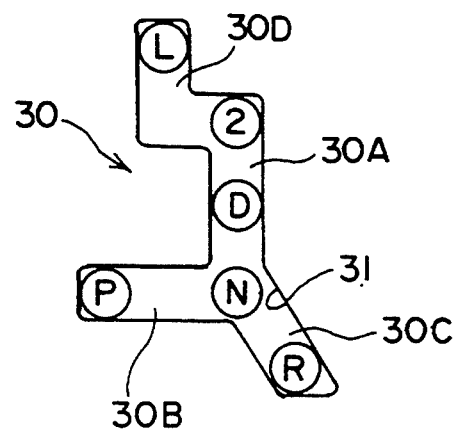
FIG. 9 is a schematic plan view of a guide groove formed in the holder of the shift-operation apparatus for an automatic transmission in accordance with the first embodiment.

As shown in FIGS. 8 and 9, the guide groove 30 is comprised of an "N - D - 2" groove 30A, a "P" groove 30B, an "R" groove 30C, and an "L" groove 30D. The "N - D - 2" groove 30A corresponds to a first shift position selected by the rotating operation of the operation knob 22; the "P" groove 30B corresponds to a second shift position selected by the axial movement of the operation knob 22; and the "R" groove 30C and the "L" groove 30D correspond to a third shift position selected by the rotation and axial movement of the operation knob 22.

In addition, in the "R" groove 30C of the guide groove 30, a portion continuing to the "N - D - 2" groove 30A and the "P" groove 30B is formed in an inclined manner with respect to the "N - D - 2" groove 30A and the "P" groove 30B to form an inclined surface 31.

In addition, a pair of pieces, i.e., small members, 34 are built in the holder 24. Each of the piece 34, together with a spring 38, is accommodated in an accommodating hole 36 formed in the holder 24, and is constantly urged in a projecting direction.

A pair of click mounts 40 serving as uneven-surface members are disposed between the holder and the distal end portion of the main body 12 in correspondence with the aforementioned pieces 34. Each of the clock mounts 40 is formed in the shape of a trough and is secured to an inner peripheral surface of the main body 12, and an uneven-surface portion 42 arranged along the axial direction of the main body 12 is formed on its inner peripheral surface. These uneven-surface portions 42 correspond to the axial movement (the movement for the shifting operation in the direction of arrow B in FIGS. 1 and 5) of the operation knob 22 (holder 24). As the pieces 34 ride over these uneven-surface portions 42, the axial movement of the holder 24, i.e., the operation knob 22, is effected with a click.

It should be noted that a retreat portion 44 is formed in the vicinity of the uneven-surface portion 42 in the click mount 40. The arrangement provided is such that when the operation knob 22 (holder 24) is rotated as will be described later, the rotation of the operation knob 22 (holder 24) is not hampered by the movement of the piece 34 from this retreat portion 44.

Figure 10:
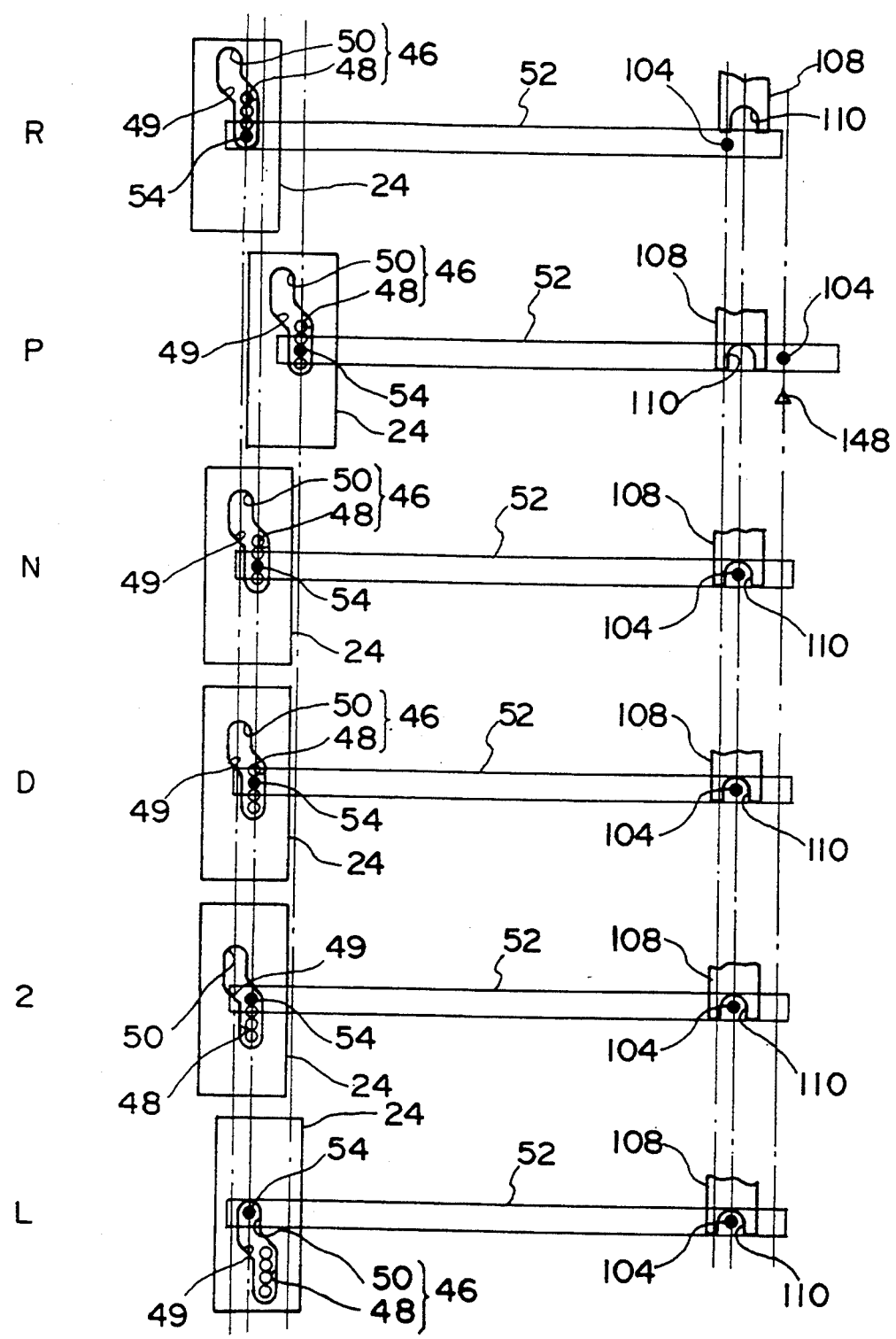
FIG. 10 is a schematic diagram illustrating relationships of correspondence among a pin, a fitting groove, a lock plate, a detent pin, and the like of the shift-operation apparatus in each shift position.

In addition, a fitting groove 46 is formed in a central portion of the holder 24. As shown in FIG. 10, the fitting groove 46 is arranged in the shape of a crank by a first groove 48, a second groove 50, and an inclined surface (groove) 49 communicating therebetween. A pin 54 of a shaft 52 accommodated slidably in the pipe 16 is inserted in this fitting groove 46. Here, the configuration of the pattern of the fitting groove 46 (the first groove 48 and the second groove 50) is formed in correspondence with the shift-operation pattern of the "R," "P," "N," "D," "2," and "L" of the operation knob 22. Namely, the first groove 48 corresponds to the respective shift positions "R," "P," "N," "D," and "2," and the pin 54 is brought to the respective position as the operation knob 22 is shifted to one of these shift positions. Meanwhile, the second groove 50 corresponds to the shift position "L," and the pin 54 is adapted to undergo relative movement from the first groove 48 to the second groove 50 as the operation knob 22 is shifted from the shift position "2" to the shift position "L." Namely, this fitting groove 46 is designed to permit the relative rotation of the holder 24 (operation knob 22) with respect to the shaft 52 between the shift positions "R," "P," "N," "D," "2," and "L."

An arm 56 extends from a rear portion of the holder 24 (at a position away from the operation knob 22), and its distal end reaches the switch section 80 which will be described later. A display pin 58 is affixed to the distal end of the arm 56. Furthermore, a pair of fitting grooves 60 are formed in the rear portion of the holder 24. The fitting grooves 60 are formed in parallel with the axis of the holder 24, and a pair of arms 64 of a rotor 62, which will be described later in detail, are respectively inserted therein.

The rotor 62 is disposed in the rear of the holder 24. The rotor 62 is formed substantially in the shape of a disk, is rotatably attached to an outer periphery of the pipe 16, and is prevented from coming off by means of a C-ring 63 (namely, the rotor 62 is held in a state in which, with respect to the pipe 16, its axial movement is prevented, and only its rotation is allowed). The rotor 62 has the pair of arms 64 formed on its side wall on the holder 24 side in such a manner as to project therefrom. These arms 64 are respectively inserted slidably in the fitting grooves 60 provided in the holder 24. Consequently, the arrangement provided is such that, with respect to the rotor 62, the holder 24 is capable of undergoing relative movement only along the axial direction, and is rotated as a unit about the axis.

A pair of rollers 66 are incorporated in the rotor 62. Each of the rollers 66 is accommodated in an accommodating portion 68 formed in the rotor 62, together with a roller holder 69 and a spring 70, and is constantly urged in a projecting direction.

A click mount 72 serving as an uneven-surface member is disposed between the rotor 62 and the distal end of the main body 12 in correspondence with the rollers 66. The click mount 72 is formed in an annular shape and is affixed to an inner peripheral surface of the main body 12, and a pair of uneven-surface portions 74 conforming with the peripheral direction of the main body 12 are formed in its inner peripheral wall. These uneven-surface portions 74 correspond to the rotation of the operation knob 22 (holder 24) (the movement for the shifting operation in the direction of arrow A in FIGS. 1 and 5). As the rollers 66 ride over these uneven-surface portions 74, the rotation of the holder 24, i.e., the operation knob 22, is effected with a click.

As described above, in the operation section 20, the operation knob 22 is provided so as to rotate about the axis of the main body 12 (pipe 16) and move in the axial direction. The operation knob 22 is thus selectively operated by being rotated to a shift position provided in correspondence with each shift range such as "N" and "D." Further, the operation knob 22 is selectively operated by being moved in the axial direction to a shift position provided in correspondence with each shift range "P" and "R." Furthermore, such movement is effected with a click by means of the holder 24 (pieces 34) and the rotor 62 (rollers 66).

The switch section 80 is disposed in the rear (on the right-hand side in FIG. 1) of the operation section 20. In the switch section 80, a contact plate 82 is affixed to a rear surface wall of the rotor 62, and a printed circuit board 84 is disposed in face-to-face relation with this contact plate 82. The contact plate 82 has a contact 86 projecting toward the printed circuit board 84, and this contact 86 is in contact with the printed circuit board 84. The printed circuit board 84 has a conductive contact surface formed in the shape of a pattern (ring), and as the contact position of the contact 86 is changed, the rotational position of the contact plate 82, i.e., the rotor 62, can be detected electrically. Namely, it is possible to detect the rotational position of the operation knob 22 which rotates about the axis together with the rotor 62, i.e., the position selected by the operation knob 22 among the shift positions provided in correspondence with the shift ranges "N" and "D."

The printed circuit board 84 is electrically connected to the automatic transmission by means of an unillustrated controller, and shifts the automatic transmission on the basis of the detected signal.

It should be noted that, in this case, since the shift positions "N" and "P" are present at the same position in the rotating direction (about the axis) of the operation knob 22, the detection of this shift position "P" is not carried out by the contact plate 82 and the printed circuit board 84, and is carried out by a P switch 148 which will be described later.

A display window 88 is provided on a side surface of the main body 12 corresponding to the switch section 80, and displays the above-described shift-operation pattern. The display pin 58 affixed to the distal end of the arm 56 of the holder 24 is located in face-to-face relation with this display window 88. Consequently, the shift position on the holder 24, i.e., the shift position selected by the operation knob 22, is displayed at the display window 88.

In addition an LED unit 90 and a light guide 92 are disposed in the switch section 80, and the display window 88 can be illuminated from inside.

The shift lock section 100 is disposed in the rear (on the right-hand side in FIG. 1) of the switch section 80.

A holding block 170 is disposed in the shift lock section 100. The holding block 170 has a through hole 172 formed in correspondence with the pipe 16, and the pipe 16 is passed through this through hole 172. In addition, the holding block 170 has a fixing hole 174 formed therein, and a support shaft 120 is fixed thereto in such a manner as to project therefrom. Furthermore, the holding block 170 has a fixing hole 176 formed therein, and a support shaft 142 is fixed thereto in such a manner as to project therefrom.

Another end of the shaft 52, which is accommodated in the pipe 16 and connected to the holder 24 by means of the pin 54, reaches an end of the pipe 16 passing through the through hole 172 in the holding block 170. In addition, a spring 102 is disposed in the pipe 16 between the shaft 52 and the baseplate 14 to constantly urge the shaft 52 toward the operation knob 22. It should be noted that the urging force of this spring 102 is so set as to be smaller than the force with which the aforementioned pieces 34 ride over the uneven-surface portions 42 of the click mounts 40, i.e., such that the holder 24 (operation knob 22) does not move in the axial direction with the urging force of the spring 102.

A detent pin 104 is secured to the other end of the shaft 52, an projects to the outside through an elongated hole 106 formed in the pipe 16.

In addition, a lock plate 108 is disposed on a side of the pipe 16 (elongated hole 106) in correspondence with the detent pin 104. The lock plate 108 is a substantially rectangular plate, and is disposed movably in directions in which the lock plate 108 moves toward or away from the detent pin 104 (elongated hole 106). A U-shaped engaging groove 110 is formed on that side of the lock plate 108 which faces the detent pin 104. The detent pin 104 is capable of being fitted into the engaging groove 110 as the lock plate 108 moves in a state in which the detent pin 104 and the lock plate 108 face each other. Furthermore, the detent pin 104 can be clamped by the lock plate 108 and a peripheral wall of the elongated hole 106 as the lock plate 108 moves closer in a state in which the detent pin 104 is moved closest toward the baseplate 14 (in the state in which the operation knob 22 is selected in the "P" shift range). The arrangement provided is such that that axial movement of the shaft 52 is prevented in a state in which the detent pin 104 is fitted in the engaging groove 110 and in a state in which the detent pin 104 is clamped by the lock plate 108 and the peripheral wall of the elongated hole 106.

In addition, a connecting groove 112 is formed in a side portion of the lock plate 108, and a lever 114 is connected to this connecting groove 112.

The lever 114 is formed into a substantially L-shaped configuration by an arm 116 and an arm 118, and a central portion is rotatably supported by the support shaft 120 fixed to the holding block 170, so that the arm 116 and the arm 118 can be rotated. A connecting portion 124 having a shaft 122 is formed at a distal end of one arm 116, and this connecting portion 124 (shaft 122) is inserted in the connecting groove 112 provided in the lock plate 108 and is connected thereto. Accordingly, the arrangement provided is such that as the lever 114 (arm 116) is rotated, the lock plate 108 is moved toward or away from the detent pin 104 (elongated hole 106).

On the other hand, a connecting portion 128 having a fitting groove 126 is formed at a distal end of the other arm 118 of the lever 114. A pin 134 secured to a plunger 132 of a solenoid 130 is inserted in this connecting portion 128 (fitting groove 126), and is connected thereto. The solenoid 130 is located in an accommodating portion 178 of the holding block 170, and is fixed therein.

The solenoid 130, when energized, is adapted to attract the plunger 132, and when the solenoid 130 is deenergized, the plunger 132 is pulled out by an urging force of a return spring 136 fitted over the plunger 132. The dimensions and the like of the respective parts are set such that the lock plate 108 is engaged with the detent pin 104 (reaches the elongated hole 106) when the solenoid 130 is deenergized. When the solenoid 130 is energized, as the plunger 132 is retracted against the urging force of the return spring 136, the arm 118 is pulled to cause the lever 114 to rotate about the support shaft 120, so that the lock plate 108 is spaced apart from the detent pin 104 (elongated hole 106).

This solenoid 130 is arranged to be energized or deenergized by electrical control corresponding to the shaft position of the operation knob 22 and the running state of the vehicle. Specifically, in a case where the operation knob 22 is shifted to the shift position "P," the solenoid 130 is normally set in a deenergized state, and is energized only when the brakes are operated. Meanwhile, in a case where the operation knob 22 is shifted to the shift position "N," "D," "2," or "L," the solenoid 130 is set in the deenergized state when the vehicle is in the running state of a medium speed or more, whereas the solenoid 130 is energized only when the vehicle is in a low-speed running state or at a standstill.

In a case where the operation knob 22 is shifted to the shift position "D," "2," or "L," control is provided by the signal representing the detection of the shift position "N" such that the solenoid 130 is not energized even when the vehicle is in a low-speed running state or at a standstill, and is energized only when the operation knob 22 is shifted to the shift position "N," i.e., such that the solenoid 130 is deenergized even when the vehicle is at the low-speed running state or at a standstill in a case where the operation knob 22 is shifted from the shift position "N" to the shift position "D," "2," or "L."

A stopper 138 is disposed in the vicinity of the lock plate 108. The stopper 138 is made of rubber, and when the solenoid 130 is actuated (energized), the stopper 138 absorbs its impact as the lock plate 108 is brought into contact therewith.

A release lever 140 is disposed in the vicinity of one arm 116 of the lever 114. The release lever 140 is rotatably supported by the support shaft 142 fixed to the holding block 170, and a connecting pin 144 formed at one end of the release lever 140 is connected to the arm 116. For this reason, the rotation of the release lever 140 about the support shaft 142 causes the lever 114 (arm 116) to rotate. A release knob 146 disposed in such a manner as to project from the main body 12 to the outside corresponds to the other end of the release lever 140. The release knob 146, upon being pressed, is capable of pressing the other end of the release lever 140, thereby making it possible to forcibly rotate the release lever 140 about the support shaft 142. Namely, the arrangement provided is such that as the release knob 146 is pressed, the lever 114 can be rotated to cause the lock plate 108 to be spaced apart from the detent pin 104 (elongated hole 106) irrespective of the actuation of the solenoid 130.

In addition, the P switch 148 is disposed in the vicinity of the detent pin 104 (elongated hole 106). A detecting piece 150 of the P switch 148 is capable of coming into contact with the detect pin 104. In a state in which the detent pin 104 is moved closest toward the baseplate 14 (when the operation knob 22 is shifted to the "P" shift range), the detecting piece 150 comes into contact with the detent pin 104 and detects the same. That is, as described above, in the shift-operation apparatus 10, since the shift positions "N" and "P" are present at the same position in the rotating direction (about the axis) of the operation knob 22, the detection of this shift position "P" is not carried out by the contact plate 82 and the printed circuit board 84, and is carried out by this P switch 148.

It should be noted that, although a detailed description will be omitted, an overdrive switch 160 is juxtaposed in the vicinity of the release knob 146.

Next, a description will be given of the operation of the shift-operation apparatus 10 having the above-described arrangement.

In the shift-operation apparatus 10 having the above-described arrangement, as the operation knob 22 is operated, each shift position is selected.

In this case, the movement of the operation knob 22 is effected with a click by means of the holder 24 (pieces 34) and the rotor 62 (rollers 66). Namely, the axial movement of the operation knob 22 (holder 24) is not transmitted to the rotor 62, and the operation knob 22 and the rotor 62 undergo relative movement with each other. Only the rotation of the operation knob 22 is transmitted thereto, so that the operation knob 22 and the rotor 62 rotate as a unit. The axial movement of the operation knob 22 (holder 24) is effected with a click by means of the pieces 34 and the click mounts 40 (uneven-surface portions 42). Meanwhile, the rotation of the operation knob 22 (the holder 24 and the rotor 62) is effected with a click by means of the rollers 66 and the click mount 72 (uneven-surface portions 74).

The selection of each shift position is effected as the operation knob 22 is shifted while the pin 32 is being guided along the guide groove 30 in the holder 24 formed in the shape of a pattern in correspondence with each shift position.

For instance, among the shift positions "N," "D," and "2," as the operation knob 22 is rotatively operated, the pin 32 moves in the "N - D - 2" groove 30A of the guide groove 30 to select each shift position "N," "D," and "2." In this case, since the operation knob 22, i.e., the holder 24, and the rotor 62 rotate as a unit, the rotor 62 is rotated by the rotation of the operation knob 22, with the result that the position of contact between the printed circuit board 84 and the contact 86 of the contact plate 82 fixed to this rotor 62 changes. Hence, the position of the contact plate 82 (rotor 62), i.e., the position selected by the operation knob 22, is detected. Consequently, the automatic transmission is shifted on the basis of this detected signal.

Also, in this case, as shown in FIG. 10, since the pin 54 of the shaft 52 which is inserted in the fitting groove 46 is capable of moving in the first groove 48, the operation knob 22 is capable of rotating without being hampered by the shaft 52, and the shaft 52 does not move.

Further, as the operation knob 22 is moved from the shift position "N" in the axial direction and is rotatively operated, the pin 32 moves in the "R" groove 30C of the guide groove 30 to select the shift position "R." In this case, since the operation knob 22 and the rotor 62 are capable of undergoing relative movement along the axial direction and rotate as a unit, the rotation of the operation knob 22 causes the rotor 62 to rotate, which is detected by the switch section 80 as described above, so as to shift the automatic transmission. Also, in this case, since the pin 54 of the shaft 52 is inserted in the first groove 48 of the fitting groove 46, the shaft 52 also moves in the axial direction with the axial movement of the operation knob 22, as shown in FIG. 10.

Still further, as the operation knob 22 is moved in the axial direction from the shift position "N," the pin 32 moves in the "P" groove 30B of the guide groove 30 to select to shift position "P." In this case, since the pin 54 of the shaft 52 is fitted in the first groove 48 of the fitting groove 46, the shaft 52 also moves in the axial direction with the axial movement of the operation knob 22 (holder 24), as shown in FIG. 10. Consequently, the detecting piece 150 of the P switch 148 is engaged with the detent pin 104, which is detected to shift the automatic transmission.

In addition, as the operation knob 22 is moved in the axial direction from the shift position "2" and is rotatively operated, the pin 32 moves in the "L" groove 30D of the guide groove 30, to select the shift position "L." This is detected by the switch section as described above, so as to shift the automatic transmission. In this case, as shown in FIG. 10, since the pin 54 of the shaft 52, which is inserted in the first groove 48 of the fitting groove 46, is capable of undergoing relative movement from the first groove 48 to the second groove 50, the shaft 52 is not moved even if he operation knob 22 (holder 24) is moved in the axial direction. Namely, when the operation knob 22 is shifted from the shift position "2" to the shift position "L," even if this operating direction is the same axial direction as in the case of selecting the shift position "P," the shaft 52 does not move (in other words, when the shift position "P" is selected, the shaft 52 also moves in the axial direction). Accordingly, in a case where the operation knob 22 is shifted to the shift position "L," the detecting piece 150 of the P switch 148 is not engaged with the detent pin 104, so that the P switch 148 is not actuated unnecessarily.

Here, the inclined surface 31, which is inclined with respect to the "N - D - 2" groove 30A and the "P" groove 30B, is formed at the portion continuing to the "N - D - 2" groove 30A and the "P" groove 30B in the "R" groove 30C of the guide groove 30 formed in the holder 24. Therefore, when the pin 32 is moved by the operation of the operation knob 22 between the "N - D - 2" groove 30A and the "R" groove 30C or between the "P" groove 30B and the "R" groove 30C, if the pin 32 reaches a position where the axial direction of the operation knob 22 and the rotation thereof are switched, the pin 32 in the guide groove 30 is brought into contact with the inclined surface 31 of the "R" groove 30C. The operation knob 22 (pin 32) can be stopped and held reliably at this position.

For instance, when the operation knob 22 is moved in the axial direction to shift from the shift position "P" to the shift position "N," and the pin 32 is moved from the "P" groove 30B to the "N - D - 2" groove 30A, the pin 32 is brought into contact with the inclined surface 31 (the boundary position between the "N - D - 2" groove 30A and the "R" groove 30C) of the "R" groove 30C and is stopped positively here. The pin 32 (operation knob 22) is thereby prevented from moving toward the "R" groove 30C (shift position "R") by jumping the same.

Also, in a case where the operation knob 22 is operated between the shift position "N," "D," or "2" and the shift position "R," for instance, not only can the pin 32 be brought into contact with the inclined surface 31 of the "R" groove 30C and stopped here positively, but also since the pin 32 moves along the inclined surface of the "R" groove 30C, the operation knob 22 can be moved smoothly by being merely operated rotatively (by imparting a rotational force thereto). Hence, the operational efficiency also improves.

Thus, in the shift-operation apparatus 10 in accordance with this embodiment, when each shift position is selected by operating the operation knob 22, the operation knob 22 can be operated smoothly between the shift positions, and the operation knob 22 can be stopped and held reliably at the shift position "N." At the same time, this arrangement can be realized by a simple structure.

Meanwhile, such movement of the operation knob 22 is effected with a click by means of the holder 24 (pieces 34) and the rotor 62 (rollers 66). In this case, the arrangement provided is such that the axial movement of the operation knob 22 (holder 24) is not imparted to the rotor 62, so that the operation knob 22 and the rotor 62 undergo relative movement, and only the rotation is imparted for integral rotation. The axial movement of the operation knob 22 (holder 24) is effected with a click by means of the pieces 34 and the click mounts 40 (uneven-surface portions 42). Meanwhile, the rotation of the operation knob 22 (the holder 24 and the rotor 62) is effected with a click by means of the rollers 66 and the click mount 72 (uneven-surface portions 74). Namely, since the clicking mechanism during the axial movement of the operation knob 22 and the clicking mechanism during the rotation thereof are arranged separately from and independently of each other, the durability of the components which constitute these clicking mechanisms improve remarkably. In addition, the configurations of the various components can be simplified.

Here, in the shift-operation apparatus 10, the solenoid 130 is actuated in accordance with individually set conditions in specific shift ranges. The operation in this case will be described in order in accordance with the shift position of the operation knob 22 and the running states of the vehicle.

In a case where the operation knob 22 is shifted to the shift position "P" (a state of vehicle stop), as shown in FIG. 10, the pin 54 of the shaft 52 is located at an end of the first groove 48 of the fitting groove 46 in the holder 24. Furthermore, in this state, the operation knob 22 is in a state in which it is pushed most toward the main body 12, and the detent pin 104 of the shaft 52 is located at that end of the elongated hole which is on the baseplate 14 side. In this state, since the solenoid 130 is in a deenergized state, the plunger 132 is pulled out by the urging force of the return spring 136 fitted over the plunger 132. Accordingly, the lock plate 108 which is connected by means of the lever 114 reaches the elongated hole 106, and the detent pin 104 is clamped by this lock plate 108 and the peripheral wall of the elongated hole 106.

As a result, the shaft 52 is prevented from moving in the axial direction, and the operation knob 22 (holder 24), which is connected to this shaft 52 with the pin 54 located at the end of the first groove 48 of the fitting groove 46, is also prevented from moving in the axial direction. Furthermore, the holder 24, i.e., the operation knob 22, is prevented from rotating by means of the pin 32 which is inserted at the position corresponding to the position "P" of the guide groove 30 in the holder 24. Accordingly, the operation knob 22 is set in a shift-lock state in which the movement of the operation knob 22 from the shift position "P" to another shift position is prevented (so called P range shift lock).

Here, if the brakes are operated, the solenoid 130 is energized, with the result that the plunger 132 is retracted against the urging force of the return spring 136, which in turn causes the arm 118 to be pulled to rotate the lever 114 about the support shaft 120. Consequently, the lock plate 108 is spaced apart from the detent pin 104 (elongated hole 106). For this reason, the axial movement of the shaft 52, i.e., the movement of the operation knob 22 from the shift position "P" to the shift position "N," becomes possible (the P range shift lock is canceled).

Meanwhile, in a case where the operation knob 22 is shifted to the shift position "N," if the vehicle is at a standstill or in a low-speed running state, the solenoid 130 is energized, which causes the plunger 132 to be retracted. Consequently, the arm 118 is pulled, and the lever 114 is rotated about the support shaft 120, allowing the lock plate 108 to be spaced apart from the detent pin 104 (elongated hole 106). For this reason, the axial movement of the shaft 52, i.e., the operation knob 22, becomes possible. Furthermore, in this state, the holder 24, i.e., the operation knob 22, is capable of undergoing relative movement with the shaft 52 in the range in which the pin 54 is capable of moving in the fitting groove 46. For this reason, as the operation knob 22 is rotated from the shift position "N," the shift position "D" or "2" can be selected. Also, as the operation knob 22 is moved in the axial direction from the shift position "N" and is rotated, the shift position "R" can be selected. Furthermore, as the operation knob 22 is moved in the axial direction from the shift position "N," the shift position "P" can be selected.

Figure 7:
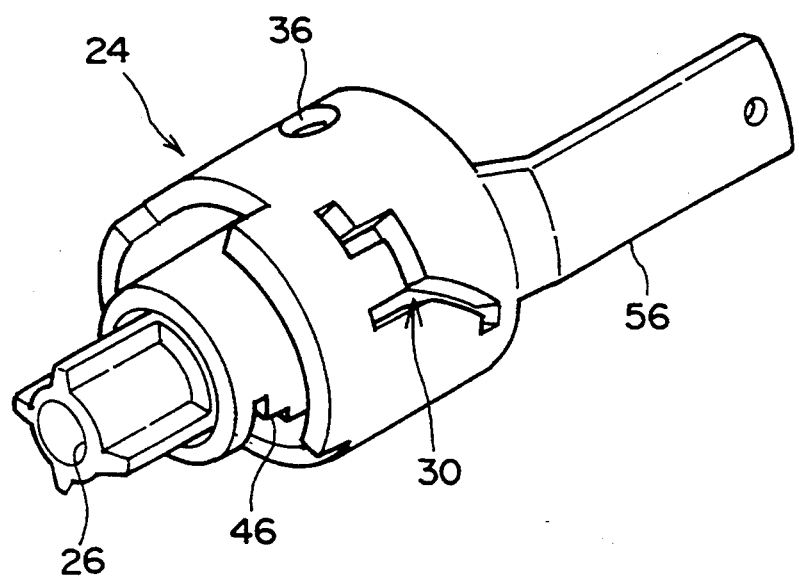
FIG. 7 is a perspective view of a holder of the shift-operation apparatus for an automatic transmission in accordance with the first embodiment.

Meanwhile, in a case where the operation knob 22 is shifted to the shift position "N," when the vehicle is in the running state of a medium speed or more, the solenoid 130 is set in the deenergized state, so that the plunger 132 is pulled out by the urging force of the return spring 136 fitted over the plunger 132. Consequently, the lock plate 108 which is connected by means of the lever 114 moves closer to the detent pin 104, and the detent pin 104 is fitted into the engaging groove 110, as shown in FIG. 7. As a result, the shaft 52 is prevented from moving in the axial direction, and the operation knob 22 (holder 24), which is connected to this shaft 52 with the pin 54 located at the end of the first groove 48 of the fitting groove 46, is also prevented from moving in the axial direction. Accordingly, the operation knob 22 is set in a shift-lock state in which the movement of the operation knob 22 from the shift position "N" to the shift position "R" or "P" is prevented (so called R shift inhibit). This shift-lock state is continued unless the vehicle speed reaches a predetermined speed or less. Also, in this case, since the pin 54 is capable of moving in the fitting groove 46, the movement of the operation knob 22 from the shift position "N" toward the shift position "D" is possible.

When the vehicle speed is set in a running state of the medium speed or less or at a standstill, the solenoid 130 is energized, thereby canceling the shift lock.

Here, in a case where the operation knob 22 is shifted to the shift position "2," when the vehicle speed is at the running state of the medium speed or less or at a standstill and the shift lock is canceled, the axial movement of the shaft 52 becomes possible. Furthermore, since this shaft 52 is urged toward the operation knob 22 by the spring 102, the pin 54 which is inserted in the first groove 48 tends to enter the second groove 50. However, since the inclined surface 49 is formed between the first groove 48 and the second groove 50, as the operation knob 22 is rotated from the shift position "2," the pin 54 easily moves to the first groove 48 while sliding along the inclined surface 49, thereby making it possible to reliably select the shift position "D."

In a case where the shift lock at the shift position "N" is canceled, and the operation knob 22 is shifted to the shift position "R," the case is not subject to the shift lock, so that the movement of the operation knob 22 (shaft 52) is possible.

On the other hand, in a case where the operation knob 22 has been shifted to the shift position "N," and a shift lock has taken place, the rotation of the operation knob 22, i.e., the movement thereof from the shift position "N" toward the shift position "D" is possible. However, in a case where the operation knob 22 is shifted from the shift position "N" to the shift position "2," the detent pin 104 is still retained by the engaging groove 110 in the lock plate 108, thereby preventing the movement of the shaft 52.

Here, however, the pin 54, which connects the operation knob 22 (holder 24) to the shaft 52, is inserted in the fitting groove 46 arranged in the shape of a crank by the first groove 48 and the second groove 50, and the pin 54 is capable of undergoing relative movement from the first groove 48 to the second groove 50. Accordingly, as the pin 54 undergoes relative movement from the first groove 48 to the second groove 50, the holder (operation knob 22) can be moved from the shift position "2" to the shift position "L." Namely, even if the shaft 52 is prevented from moving in the axial direction at the shift position "2" by the lock plate 108, as the pin 54 undergoes relative movement from the first groove 48 to the second groove 50, it is possible to effect the shifting operation of the operation knob 22 (holder 24). For this reason, even if the operating direction of the operation knob 22 when selecting the shift position "L" is the same as the same axial direction as in the case where the shift position "P" is selected, the shaft 52 does not move, so that the detecting piece 150 of the P switch 148 is not engaged with the detent pin 104, thereby preventing the P switch 148 from being actuated unnecessarily.

Furthermore, with this shift-operation apparatus 10, this shift-lock state can be canceled by a manual operation irrespective of the shift lock state due to the actuation of the solenoid 130.

Namely, since the release lever 140 is disposed in the vicinity of the lever 114, and the release knob 146 is provided correspondingly, as this release knob 146 is pressed, the lever 114 can be forcibly rotated by means of the release lever 140, thereby making it possible to causing the lock plate 108 to be spaced apart from the detent pin 104 (elongated hole 106) (mechanical cancellation of a shift lock). For this reason, even if the power supply is shut off, the axial movement of the shaft 52, i.e., the operation of the operation knob 22, becomes possible, and this arrangement is effective at the time of a servicing operation as well.

It should be noted that as the solenoid 130 is actuated irrespective of the shift position of the operation knob 22, the lock plate 108 can be spaced apart from the detent pin 104 (elongated hole 106) (electrical cancellation of a shift lock).

As described, with the shift-operation apparatus 10, the arrangement provided is such that the fitting groove 46 comprised of the first groove 48 and the second groove 50 is formed in the holder 24, and the pin 54 of the shaft 52 is inserted in this fitting groove 46, and the shaft 52 is connected to the holder 24, i.e., the operation knob 22. Consequently, even in the shift-lock state in which the axial movement of the operation knob 22 (shaft 52) is prevented, it is possible to effect the shifting operation by the rotation of the operation knob 22 (the operation of selecting the shift positions "N," "D," and "2") as well as the shift operation involving the rotation of the operation knob 22 and the axial movement thereof (the operation of selecting the shift position "L") without any trouble. Also, it is possible to set a multiplicity of shift positions which are selected by the operation knob 22.

In addition, with the shift-operation apparatus 10, the arrangement provided is such that the axial movement of the operation knob 22 (holder 24) is not imparted to the rotor 62, so that the operation knob 22 and the rotor 62 undergo relative movement, and only the rotation is imparted for integral rotation. The axial movement of the operation knob 22 (holder 24) is effected with a click by means of the pieces 34 and the click mounts 40 (uneven-surface portions 42). Meanwhile, the rotation of the operation knob 22 (the holder 24 and the rotor 62) is effected with a click by means of the rollers 66 and the click mount 72 (uneven-surface portions 74).

Accordingly, the operation knob 22 can be smoothly and reliably rotated and moved in the axial direction with a click to select each shift position, each shift position thus selected is not shifted unnecessarily by other than the operation of the operation knob 22. Furthermore, since the clicking mechanism during the axial movement of the operation knob 22 and the clicking mechanism during the rotation thereof are arranged separately from and independently of each other, the durability of the components which constitute these clicking mechanisms improve remarkably. Even if the operation of selecting the shift positions of the operation knob 22 is carried out frequently, it is possible to maintain the initial performance. In addition, the configurations of the various components can be simplified.

Next, a description will be given of a second embodiment of the present invention. It should be noted that components that are basically identical to those of the first embodiment will be denoted by the same reference numerals as those of the first embodiment, and a description thereof will be omitted.

Figure 11:
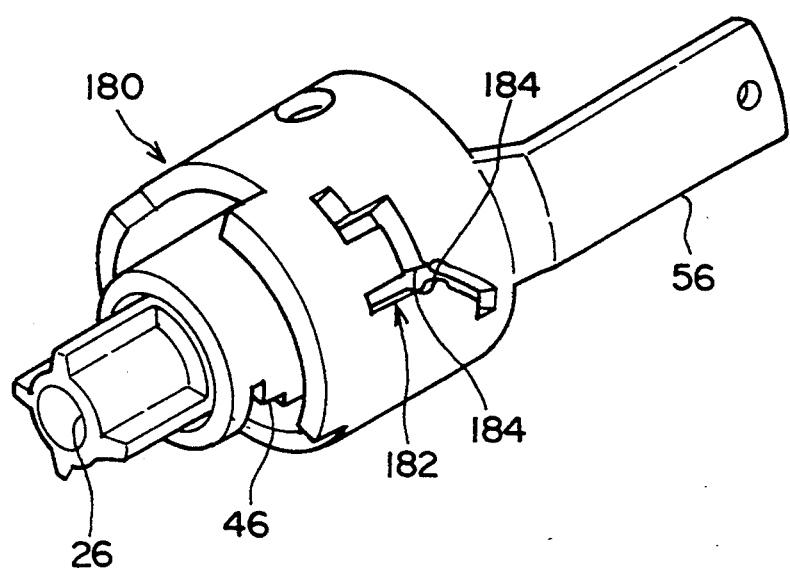
FIG. 11 is a perspective view of a holder of the shift-operation apparatus for an automatic transmission in accordance with a second embodiment.

FIG. 11 shows a perspective view of a holder 180 which is used in a shift-operation apparatus in accordance with the second embodiment. This holder 180 has a guide groove 182 which is basically similar to the guide groove 30 shown in the first embodiment.

Figure 12:
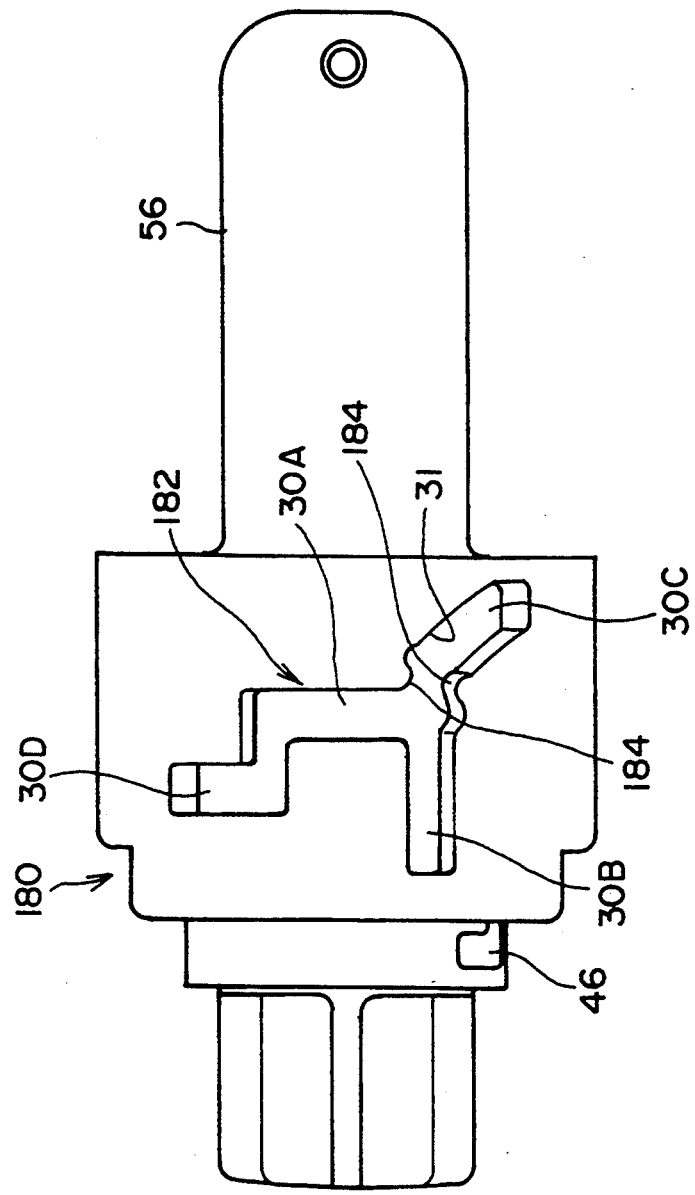
FIG. 12 is a plan view of the holder of the shift-operation apparatus for an automatic transmission in accordance with the second embodiment.
Figure 13:
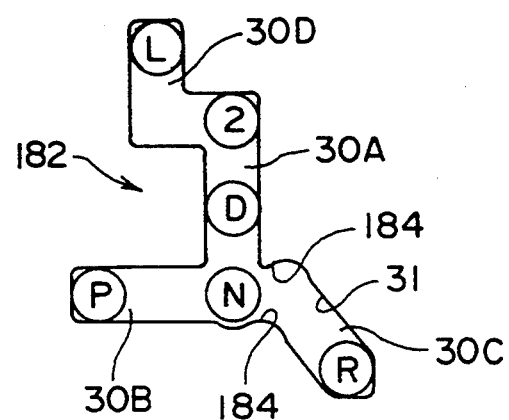
FIG. 13 is a schematic plan view of a guide groove formed in the holder of the shift-operation apparatus for an automatic transmission in accordance with the second embodiment.

As also shown in FIGS. 12 and 13, this guide groove 182 is provided with a projection portion 184 at a boundary position continuing to the "N - D - 2" groove 30A and the "P" groove 30B in the inclined surface 31 (the portion continuing to the "N - D - 2" groove 30A and the "P" groove 30B) of the "R" groove formed in an inclined manner. This projecting portion 184 is capable of engaging the pin 32 which is inserted in the guide groove 182.

Accordingly, according to the holder 180 of this second embodiment, when the pin 32 is moved between the between the "N - D - 2" groove 30A and the "R" groove 30C or between the "P" groove 30B and the "R" groove 30C by the operation of the operation knob 22, the pin 32 in the guide groove 182 is engaged with the projecting portion 184 when the pin 32 is brought into contact with the inclined surface 31 of the "R" groove 30C. The operation knob 22 can be stopped and held positively at this position.

For instance, when the operation knob 22 is moved to shift from the shift position "D" to the shift position "N," the pin 32 is stopped positively at the projecting portion 184, and the pin 32 (operation knob 22) is prevented from moving toward the "R" groove 30C (shift position "R") by jumping this projecting portion 184. Also, when the operation knob 22 is moved from the shift position "R" to the shift position "N," the pin 32 is stopped reliably at the projecting portion 184, and the pin 32 (operation knob 22) is prevented from moving toward the "N - D - 2" groove 30A (shift position "D") by jumping the projecting portion 184.

Thus, with the holder 180 of the shift-operation apparatus in accordance with this second embodiment, when each shift position is selected, it is possible to stop and hold the operation knob 22 more reliably at the shift position "N." At the same time, this arrangement can be realized with a simple structure.

What is claimed is:

1. A shift-operation apparatus for an automatic transmission, comprising:

an operation knob capable of rotation and axial movement and having a first shift position selected by a rotating operation, a second shift position selected by the axial movement, and a third shift position selected by the rotation and the axial movmement;

switch means for detecting a selected shift position of said operation knob so as to shift said automatic transmission;

a shaft disposed movably along an axis of said operation knob;

locking means disposed engageably and detachably with respect to said shaft, said locking means being adapted to prevent the axial movement of said shaft in an engaged state;

a solenoid connected to said locking means, said solenoid being actuated under a predetermined condition to cancel the engagement between said lock plate and said shaft; and a holder fixed integrally to said operation knob and adapted to move always with said operation knob, said holder being connected to said shaft so as to permit the movement of said operation knob to one of the first shift position and the third shift position in a state in which said lock plate is engaged with said shaft and the axial movement of said shaft is prevented.

2. A shift-operation apparatus for an automatic transmission according to claim 1, wherein said switch means comprises first switch means for detecting the first shift position and the third shift position and second switch means for detecting the second shift position.

3. A shift-operation apparatus for an automatic transmission according to claim 1, further comprising shock-absorbing means for absorbing a shock by allowing said lock plate to come into contact with said shock-absorbing means when the engagement between said lock plate and said shaft is canceled.

4. A shift-operation apparatus for an automatic transmission according to claim 3, wherein said shock-absorbing means is a resilient member.

5. A shift-operation apparatus for an automatic transmission according to claim 1, wherein said holder has a groove, said shaft has a first pin which is inserted and disposed in said groove, and said holder and said shaft are connected to each other by means of said groove and said first pin.

6. A shift-operation apparatus for an automatic transmission according to claim 1, further comprising:

axially clicking means disposed between said operation knob and a main body of said shift-operation apparatus so as to provide a click when said operation knob is moved in an axial direction;

a rotor for rotating integrally with said operation knob and connected to said operation knob in such a manner as to be capable of undergoing relative movement in the axial direction with respect to said operation knob; and rotating-direction clicking means disposed between said rotor and said main body of said shift-operation apparatus so as to provide a click when said operation knob is moved in a rotating direction.

7. A shift-operation apparatus for an automatic transmission according to claim 6, wherein said axially clicking means includes a first uneven-surface portion provided on one of said operation knob and said main body of said shift-operation apparatus and a small member disposed on another of said operation knob and said main body of said shift-operation apparatus and urged toward said first uneven-surface portion.

8. A shift-operation apparatus for an automatic transmission according to claim 7, wherein said rotating-direction clicking means includes a second uneven-surface portion provided on one of said rotor and said main body of said shift-operation apparatus and a roller disposed on another of said rotor and said main body of said shift-operation apparatus and urged toward said second uneven-surface portion.

9. A shift-operation apparatus for an automatic transmission according to claim 1, further comprising guiding and limiting means disposed between said operation knob and a main body of said shift-operation apparatus so as to guide said operation knob during the rotation and axial movement of said operation knob and limit the rotation and axial movement.

10. A shift-operation apparatus for an automatic transmission according to claim 9, wherein said guiding and limiting means has a guide groove corresponding to the first, second, and third shift positions and formed in a shape of a pattern to connect the first, second, and third shift positions, and a second pin inserted movably in said guide groove, a portion of said guide groove leading from a connecting portion with respect to the first, second, and third shift positions to the third shift position being inclined with respect to a portion of said guide groove leading from the first shift position to said connecting portion and a portion of said guide groove leading from the second shift position to said connecting portion.

11. A shift-operation apparatus for an automatic transmission according to claim 10, wherein a projecting portion is provided in a vicinity of said connecting portion in said portion of said guide groove leading from said connecting portion to the third shift position.

12. A shift-operation apparatus for an automatic transmission, comprising:

an operation knob capable of rotation and axial movement for selecting a shift position by a rotating operation and/or an axially moving operation;

switch means for detecting a selected shift position of said operation knob so as to shift said automatic transmission;

an axially clicking mechanism including a first uneven-surface portion provided on one of said operation knob and said main body of said shift-operation apparatus and a small member disposed on another of said operation knob and said main body of said shift-operation apparatus and urged toward said first uneven-surface portion, so as to provide a click when said operation knob is moved in an axial direction;

a rotor for rotating integrally with said operation knob and connected to said operation knob in such a manner as to be capable of undergoing relative movement in the axial direction with respect to said operation knob; and a rotating-direction clicking mechanism including a second uneven-surface portion provided on one of said rotor and said main body of said shift-operation apparatus and a roller disposed on another of said rotor and said main body of said shift-operation apparatus, so as to provide a click when said operation knob is moved in a rotating direction.

13. A shift-operation apparatus for an automatic transmission according to claim 12, wherein said operation knob has a first shift position selected by the rotating operation, a second shift position selected by the axial movement, and a third shift position selected by the rotation and the axial movmement.

14. A shift-operation apparatus for an automatic transmission according to claim 13, further comprising:
a shaft disposed movably along an axis of said operation knob;
locking means disposed engageably and detachably with respect to said shaft, said locking means being adapted to prevent the axial movement of said shaft in an engaged state;
a solenoid connected to said locking means, said solenoid being actuated under a predetermined condition to cancel the engagement between said lock plate and said shaft; and
a holder fixed integrally to said operation knob and adapted to move always with said operation knob, said holder being connected to said shaft so as to permit the movement of said operation knob to one of the first shift position and the third shift position in a state in which said lock plate is engaged with said shaft and the axial movement of said shaft is prevented.

15. A shift-operation apparatus for an automatic transmission according to claim 14, wherein said switch means comprises first switch means for detecting the first shift position and the third shift position and second switch means for detecting the second shift position.

16. A shift-operation apparatus for an automatic transmission according to claim 14, further comprising shock-absorbing means for absorbing a shock by allowing said lock plate to come into contact with said shock-absorbing means when the engagement between said lock plate and said shaft is canceled.

17. A shift-operation apparatus for an automatic transmission, comprising:
an operation knob capable of rotation and axial movement and having a first shift position selected by a rotating operation, a second shift position selected by the axial movement, and a third shift position selected by the rotation and the axial movmement;
a guide groove corresponding to the first, second, and third shift positions and formed in a shape of a pattern to connect the first, second, and third shift positions;
a pin inserted movably in said guide groove,
wherein a portion of said guide groove leading from a connecting portion with respect to the first, second, and third shift positions to the third shift position is inclined with respect to a portion of said guide groove leading from the first shift position to said connecting portion and a portion of said guide groove leading from the second shift position to said connecting portion.

18. A shift-operation apparatus for an automatic transmission according to claim 17, wherein a projecting portion is provided in a vicinity of said connecting portion in said portion of said guide groove leading from said connecting portion to the third shift position.

19. A shift-operation apparatus for an automatic transmission according to claim 18, wherein said guide groove is provided in said operation knob, and said pin is provided in a main body of said shift-operation apparatus.

20. A shift-operation apparatus for an automatic transmission according to claim 18, further comprising:
switch means for detecting a selected shift position of said operation knob so as to shift said automatic transmission;
a shaft disposed movably along an axis of said operation knob;
locking means disposed engageably and detachably with respect to said shaft, said locking means being adapted to prevent the axial movement of said shaft in an engaged state;
a solenoid connected to said locking means, said solenoid being actuated under a predetermined condition to cancel the engagement between said lock plate and said shaft; and
a holder fixed integrally to said operation knob and adapted to move always with said operation knob, said holder being connected to the shaft so as to permit the movement of said operation knob to one of the first shift position and the third shift position in a state in which said lock plate is engaged with said shaft and the axial movement of said shaft is prevented.

* * * * *